United States Patent
Tiedemann et al.

(10) Patent No.: US 9,809,411 B2
(45) Date of Patent: Nov. 7, 2017

(54) INTEGRAL ANTI-ROLLBACK FOR INJECTION MOLDED TAPE DISPENSERS

(71) Applicants: Larry E. Tiedemann, Winona, MN (US); Robert J. Harter, La Crosse, WI (US)

(72) Inventors: Larry E. Tiedemann, Winona, MN (US); Robert J. Harter, La Crosse, WI (US)

( * ) Notice: Subject to any disclaimer, the term of this patent is extended or adjusted under 35 U.S.C. 154(b) by 202 days.

(21) Appl. No.: 14/731,614

(22) Filed: Jun. 5, 2015

(65) Prior Publication Data

US 2015/0266692 A1    Sep. 24, 2015

(51) Int. Cl.
  *B65H 35/00*  (2006.01)
  *B29C 33/00*  (2006.01)
  *B29C 45/16*  (2006.01)

(52) U.S. Cl.
  CPC ....... *B65H 35/0026* (2013.01); *B29C 33/005* (2013.01); *B29C 45/1676* (2013.01); *Y10T 156/1795* (2015.01)

(58) Field of Classification Search
  CPC ............ B65H 35/0033; B65H 35/0026; B29C 45/0001; B29C 45/0053; B29C 45/1676; B29C 2045/0089; B29C 33/005; B29L 2031/772
  See application file for complete search history.

(56) References Cited

U.S. PATENT DOCUMENTS

| | | | |
|---|---|---|---|
| 2,676,765 A | 4/1954 | Kaplan | |
| 2,731,084 A | 1/1956 | Burns | |
| 3,155,301 A | 11/1964 | Kusek | |
| 3,725,182 A | 4/1973 | Regan | |
| 3,895,059 A | 7/1975 | Link | |
| 4,623,421 A | 11/1986 | Cardin | |
| 4,729,518 A | 3/1988 | Mathna et al. | |
| 4,961,525 A | 10/1990 | Corbo et al. | |
| 4,998,655 A | 3/1991 | Huang | |
| 5,071,051 A | 12/1991 | Corbo et al. | |
| 5,380,395 A | 1/1995 | Uchida | |
| 5,802,695 A | 9/1998 | Willoughby | |
| 5,820,005 A * | 10/1998 | Perkitny | B65H 35/0026 225/65 |
| 5,861,080 A | 1/1999 | Yang et al. | |
| 5,878,932 A | 3/1999 | Huang | |
| 5,921,450 A | 7/1999 | Robinson | |
| D442,227 S | 5/2001 | Carlson et al. | |
| D448,413 S | 9/2001 | Carlson et al. | |
| 6,669,070 B2 | 12/2003 | Huang | |
| 6,672,532 B1 | 1/2004 | Huang | |
| D507,020 S | 7/2005 | Mueller et al. | |
| 6,923,358 B2 | 8/2005 | Chandaria | |

(Continued)

*Primary Examiner* — Jacob Cigna
(74) *Attorney, Agent, or Firm* — www.bobharter.com; Robert J. Harter

(57) ABSTRACT

A tape dispenser system includes a monolithic plastic injection molded frame with an integral anti-reverse rotation pawl. To help prevent the free end of a roll of tape from accidentally retracting, falling back, and frustratingly bonding onto the coiled portion of the tape, the pawl engages the inner diameter of a cardboard spool that holds the roll of tape. Strategically located mold parting lines and certain air gaps allow injection molding of a dispenser frame that has two spool-supporting sidewalls plus the integral pawl.

2 Claims, 7 Drawing Sheets

(56) References Cited

U.S. PATENT DOCUMENTS

| | | |
|---|---|---|
| 7,021,356 B2 | 4/2006 | Kelders et al. |
| 7,077,185 B2 | 7/2006 | Steinberger |
| D529,093 S | 9/2006 | Gullicks et al. |
| D533,594 S | 12/2006 | Gullicks et al. |
| D533,905 S | 12/2006 | Gullicks et al. |
| D534,589 S | 1/2007 | Gullicks et al. |
| 7,195,048 B2 | 3/2007 | Wojtkun et al. |
| 7,353,854 B2 | 4/2008 | Yu Chen |
| D568,400 S | 5/2008 | Packard et al. |
| 7,370,782 B2 | 5/2008 | Thompson et al. |
| D588,646 S | 3/2009 | Vulpitta |
| D591,354 S | 4/2009 | Vulpitta |
| 7,712,508 B2 | 5/2010 | Huang |
| 8,042,592 B2 | 10/2011 | Crawford et al. |
| 8,191,597 B2 | 6/2012 | Vulpitta |
| D664,201 S | 7/2012 | Packard et al. |
| D665,027 S | 8/2012 | Packard et al. |
| D681,734 S | 5/2013 | Hagglund et al. |
| D687,102 S | 7/2013 | Chandaria |
| 8,479,794 B2 | 7/2013 | Vulpitta |
| 8,746,316 B2 | 6/2014 | Kropp et al. |
| 8,813,806 B2 | 8/2014 | Vulpitta |
| 8,925,611 B2 | 1/2015 | Hagglund et al. |
| 8,955,572 B2 | 2/2015 | Huang |
| 2002/0079345 A1 | 6/2002 | Shah |
| 2003/0155394 A1* | 8/2003 | Huang ............... B65H 35/0026 225/65 |
| 2006/0219748 A1* | 10/2006 | Thompson ......... B65H 35/0026 225/16 |
| 2010/0084450 A1 | 4/2010 | Vulpitta |

\* cited by examiner

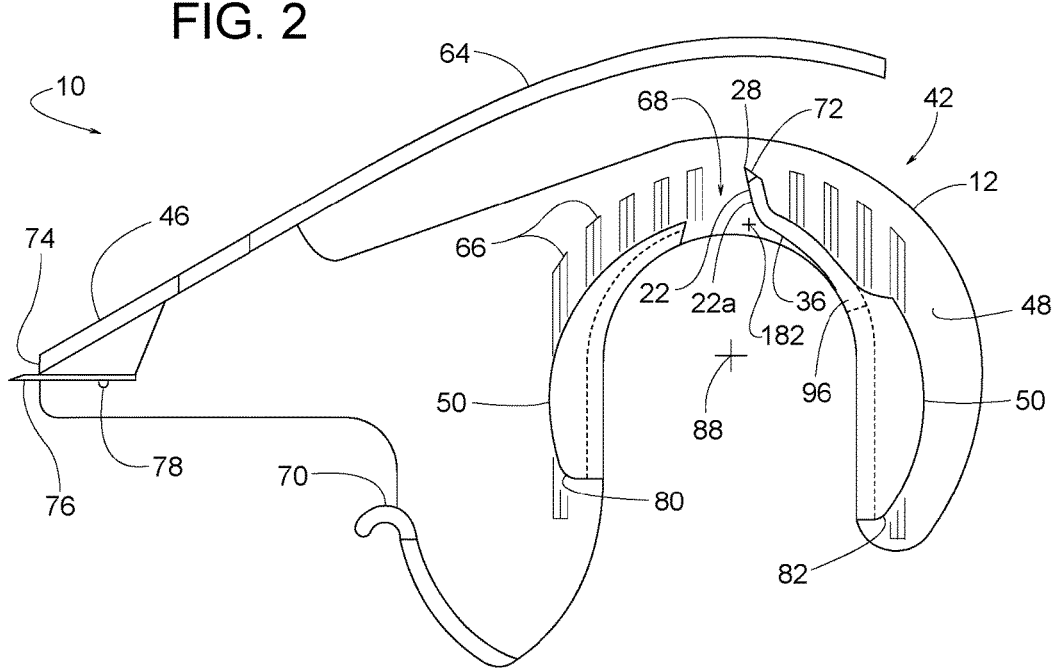
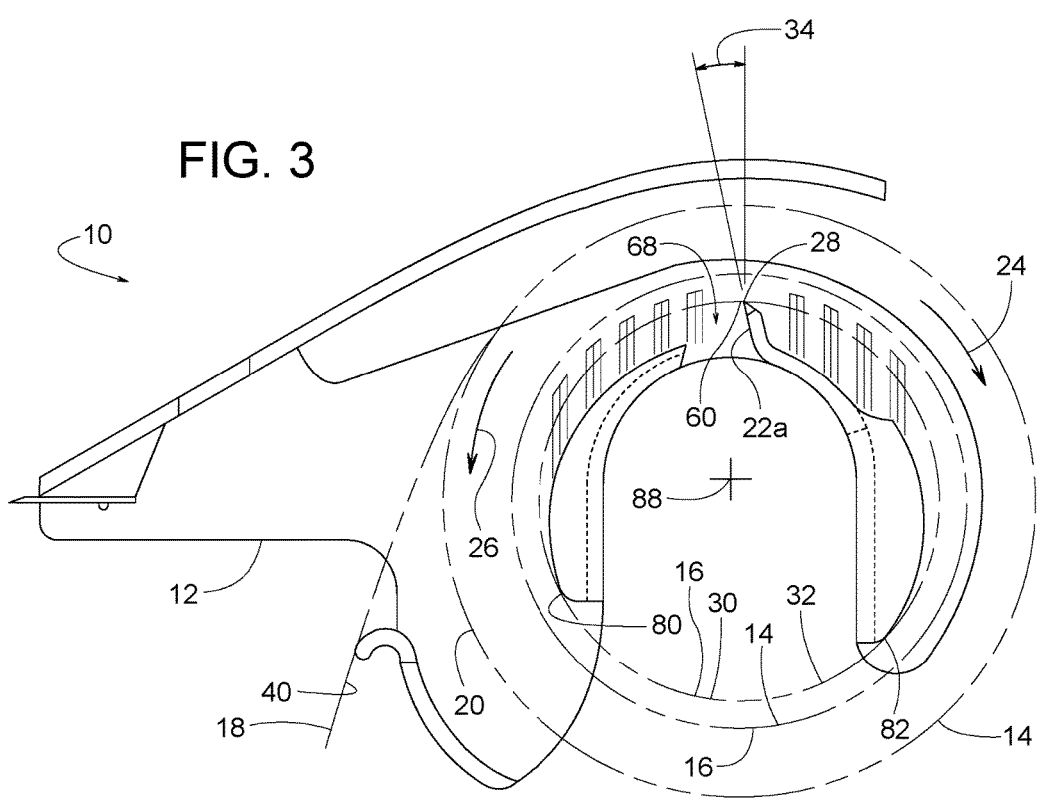

INTEGRAL ANTI-ROLLBACK FOR INJECTION MOLDED TAPE DISPENSERS

FIELD OF THE DISCLOSURE

The present disclosure relates to adhesive tape dispensers for handling a roll of tape and more specifically to plastic injection molded dispensers with integral means for preventing the end of the tape from accidentally falling back onto the roll.

BACKGROUND

Some pressure-sensitive adhesive tapes come preloaded in a plastic tape dispenser. One example of such tape is sometimes referred to as packaging tape, packing tape, shipping tape, box-sealing tape or parcel tape. Packaging tape is often made of about a two-inch wide strip of polypropylene or polyester film with a pressure-sensitive adhesive coating on one side of the film. The tape is usually wound upon a cardboard spool with the adhesive side of the film facing inward toward the spool. Consumers and businesses often use packaging tape for sealing cardboard boxes. Depending on the cost, durability and design of the dispenser, some plastic tape dispensers are reusable while others are more disposable.

SUMMARY

The tape dispenser system disclosed herein helps prevent the free end of a roll of tape from accidentally falling back onto the coiled portion of the tape. This is accomplished with at least one anti-reverse rotation pawl that is a seamless integral extension of a monolithic tape dispenser frame. The pawl being an integral extension of the frame itself avoids or minimizes the use of moving parts, and thus avoids or reduces assembly costs and frictional wear. In some examples, the frame is plastic injection molded with a parting line that is strategically positioned to enable the frame to have two spool-supporting sidewalls that provide the roll of tape with greater support.

In one aspect, a tape dispenser system is provided that includes a first sidewall; a second sidewall spaced apart from the second sidewall to define a spool-receiving chamber between the first sidewall and the second sidewall; a bridge providing an integral seamless connection between the first sidewall and the second sidewall; a first flange extending from the first sidewall toward the second sidewall, the first flange defining an air gap between a first segment of the first flange and a second segment of the first flange; a second flange extending from the second sidewall toward the first sidewall; a spool having selectively an installed position and a removed position, the spool being radially supported by the first flange and the second flange within the spool-receiving chamber when the spool is in the installed position, the spool being outside of the spool-receiving chamber when the spool is in the removed position, the spool being tubular and having an axial length and an inner surface; an adhesive tape wrapped around the spool; and a first pawl extending from at least one of the first sidewall and the first flange, the first pawl having a first tip that is spaced apart from both the first sidewall and the second sidewall, the first tip engaging a point of contact on the inner surface of the spool when the spool is in the installed position, the first tip being between the air gap and the point of contact on the inner surface of the spool when the spool is in the installed position.

In another aspect, a tape dispenser system is provided that includes a first sidewall; a second sidewall spaced apart from the second sidewall to define a spool-receiving chamber between the first sidewall and the second sidewall; a bridge extending from the first sidewall to the second sidewall, the bridge having a tape-discharge edge; a first flange extending from the first sidewall toward the second sidewall; a second flange extending from the second sidewall toward the first sidewall; a spool having selectively an installed position and a removed position, the spool being radially supported by the first flange and the second flange within the spool-receiving chamber when the spool is in the installed position, the spool being outside of the spool-receiving chamber when the spool is in the removed position, the spool having an axial length and an inner diameter; an adhesive tape wrapped around the spool; a first pawl extending from at least one of the first sidewall and the first flange, the first pawl having a first tip that is spaced apart from both the first sidewall and the second sidewall, the first tip engaging the inner diameter of the spool when the spool is in the installed position; a first side member being comprised of the first sidewall, the first flange and the first pawl; a second side member being comprised of the second sidewall and the second flange; and a monolithic frame being comprised of the first side member, the second side member and the bridge; the monolithic frame being configured selectively to a relaxed position, a splayed position, and a loaded position; the first pawl being at a first distance from the second sidewall when the monolithic frame is in the relaxed position; the first pawl being at a second distance from the second sidewall when the monolithic frame is in the splayed position; the first pawl being at a third distance from the second sidewall when the monolithic frame is in the loaded position; the second distance being greater than the first distance; the second distance being greater than the third distance; the second distance providing sufficient clearance for the spool to be moved between the installed position and the removed position; the monolithic frame being in the relaxed position when the spool is in the removed position; and the monolithic frame being in the loaded position when the spool is in the installed position.

In another aspect, a tape dispenser method involves the use of a first mold block, a second mold block, and a plastic material, wherein the tape dispenser method includes the first mold block defining a first cavity system; the second mold block defining a second cavity system; forcing the first mold block and the second mold block together such that the first mold block and the second mold block engage each other at a mold interface; upon forcing the first mold block and the second mold block together, the first cavity system and the second cavity system creating a total cavity; injecting the plastic material into the total cavity; solidifying the plastic material in the total cavity, thereby creating a tape dispenser frame comprising a first sidewall, a first flange on the first sidewall, a second sidewall, a second flange on the second sidewall, a bridge extending between the first sidewall and the second sidewall, and a first pawl extending from at least one of the first sidewall and the first flange; the first sidewall at least momentarily extending into both the first cavity system and the second cavity system; the second sidewall at least momentarily extending into both the first cavity system and the second cavity system; removing the tape dispenser frame from the total cavity; resiliently splaying the first sidewall and the second sidewall to widen a spool-receiving chamber between the first sidewall and the second sidewall; inserting the spool into the spool-receiving chamber; at least one of the first sidewall and the second sidewall flexing toward the spool; the first flange and the second flange supporting the spool; and the first pawl engaging an inner diameter of the spool such that the spool can rotate more freely in one direction than in an opposite direction.

The above summary is not intended to describe each disclosed embodiment of every implementation of the present invention. The brief description of the drawings and the detailed description which follows more particularly exemplify illustrative embodiments.

BRIEF DESCRIPTION OF THE DRAWINGS

FIG. 2 is a cross-sectional view taken along line 2-2 of FIG. 4.

FIG. 3 is a cross-sectional view similar to FIG. 2 but showing an installed roll of tape in phantom lines.

DETAILED DESCRIPTION

Figure 1:
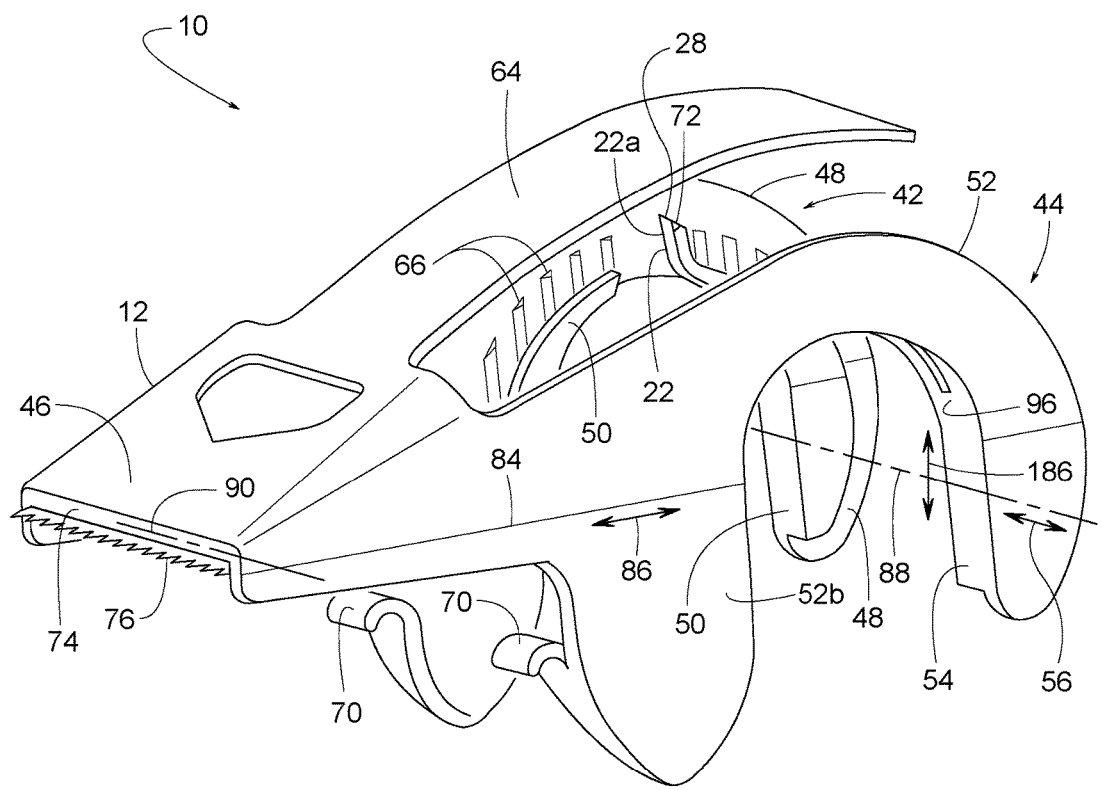
FIG. 1 is a front-left-top perspective view an example tape dispenser system constructed in accordance with the teachings disclosed herein.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

FIGS. 1-10 show various views and configurations of an example tape dispenser system 10 comprising a plastic injected molded frame 12 for supporting a coil of adhesive tape 14 wrapped around a spool 16. To prevent a free end 18 of tape 14 from accidentally retracting and adhering back onto a coiled portion 20 of tape 14, frame 12 includes at least one integral pawl 22 (e.g., a first pawl 22a and second pawl 22b) for inhibiting reverse rotation of spool 16. Arrow 24 of FIG. 3 represents the direction of inhibited reverse rotation, and arrow 26 represents the permitted forward direction of rotation during normal use. To inhibit reverse rotation, a tip 28 of pawl 22 engages an inner diameter 30 or inner surface 32 of spool 16 at a favorable rake angle 34 (e.g., between about five and twenty degrees), and a spring arm 36 of pawl 22 presses tip 28 radially outward against spool 16 at a desirable pressure.

In some examples, spool 16 is a cardboard tube having an axial length 38 and inner surface 32. Tape 14 is made of a polypropylene or polyester film with a pressure-sensitive adhesive coating 40 on an underside of the film. Such tape is sometimes known as packaging tape, packing tape, box-sealing tape or parcel tape.

In the illustrated example, tape dispenser system 10 comprises a first side member 42, a second side member 44 and a bridge 46 that provides an integral seamless connection between side members 42 and 44. In some examples, first side member 42 comprises a first sidewall 48, a first flange 50 extending inwardly from first sidewall 48, and first pawl 22a extending from first flange 50 and/or from first sidewall 48. Likewise, second side member 44 comprises a second sidewall 52, a second flange 54 extending inwardly from second sidewall 52, and second pawl 22b extending from second flange 54 and/or from second sidewall 52. Sidewalls 48 and 52 are spaced apart in an axial direction 56 to create a spool-receiving chamber 58 (FIG. 9) between sidewalls 48 and 52.

In some examples, to make frame 12 completely functional yet so inexpensive that some might consider it to be disposable, bridge 46 and side members 42 and 44 are plastic injection molded as a seamless unitary piece, whereby frame 12 is monolithic. Frame 12 being a seamless, monolithic piece makes it maintenance-free and quick and easy to manufacture. Although frame 12 can be made of various materials, some example frame materials are chosen so as to address the tape dispenser's various and sometimes conflicting design requirements. For some examples of tape dispenser system 10, the design requirements include, frame 12 having sufficient structural strength and stiffness to support a spool a tape, frame 12 being sufficiently flexible for loading or replacing a spool of tape between two side members 42 and 44, pawl 22 being stiff enough to exert enough gripping pressure against spool 16, pawl 22 being sufficiently flexible to accommodate radial movement and dimensional variance of spool 16, and pawl 22 providing an appropriate coefficient of friction at a point of contact 60 where tip 28 of pawl 22 engages inner surface 32 or inner diameter 30 of spool 16. To accomplish all this, some examples of frame 12 are plastic injection molded of ABS (acrylonitrile butadiene styrene).

Figure 6:
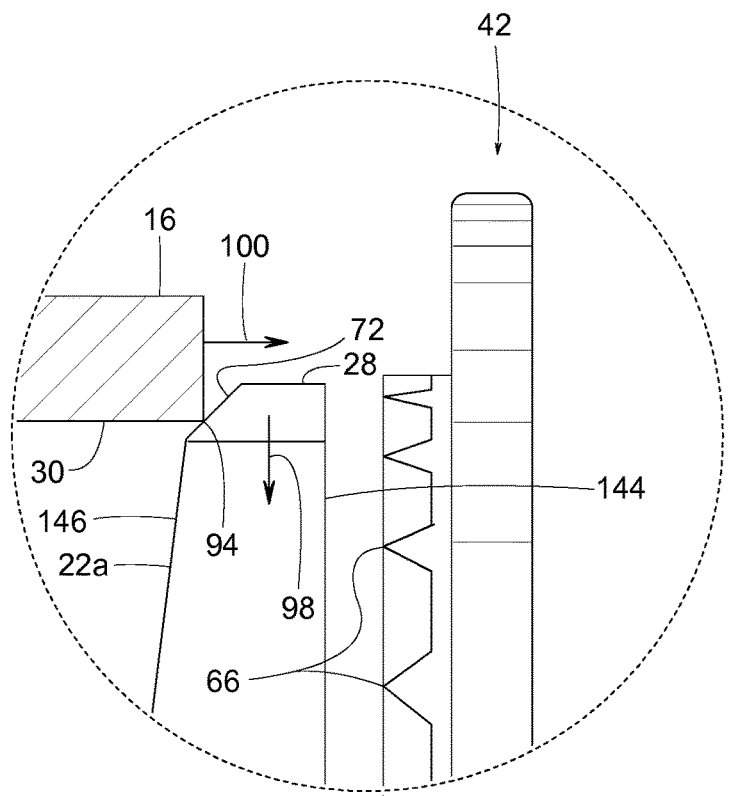
FIG. 6 is an enlarged view similar to FIG. 7 but showing the spool in the process of being installed.
Figure 7:
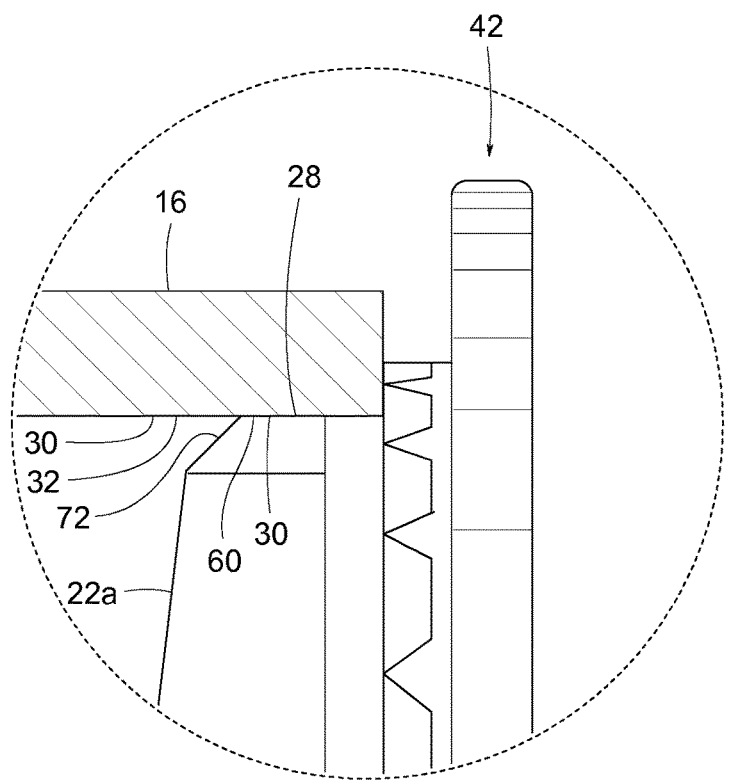
FIG. 7 is an enlarged view of encircled section-7 of FIG. 5.

Additional features of some examples of tape dispenser system 10 include a semi-flexible tongue 64, a series of ribs 66, an air gap 68 between two flange segments 50a and 50b of flange 50, a pair of tape-supporting ledges 70, a lead-in surface 72 at the pawl's tip 28, a tape-discharge edge 74 on bridge 46, a serrated blade 76 for cutting tape 14 near tape-discharge edge 74, one or more blade-holding features 78, multiple contact points 80 and 82 for supporting spool 16 in a radial direction, and a mold parting line 84 extending generally in a longitudinal direction 86 between a rotational axis 88 of spool 16 and an edge line 90 defined by tape-discharge edge 74. Tongue 64 can be used as a frictional brake pad for momentarily holding the roll of tape. Ribs 66 provide the equivalent of a flat contact surface against the axial ends 92 of spool 16 even if sidewalls 48 and 52 do not lie parallel to each other. Air gap 68 provides mold clearance for facilitating plastic injection molding of pawl 22 without interfering with flange 50 or 54. After blade 76 cuts off tape 14, ledges 70 prevent the tape's free end 18 from falling back onto the roll of tape, which works well if the roll of tape is kept from rotating backwards. Lead-in surface 72 at the pawl's tip 28, as shown in FIGS. 6 and 7, engages an inner axial edge 94 of spool 16 to help guide spool 16 into its installed position. Lead-in surface 72 is neither parallel nor perpendicular to rotational axis 88. Although lead-in surface 72 is tapered and straight in the illustrated example, other examples of lead-in surface 72 are tapered and curved. Blade-holding features 78, in some examples, are integral pins or protrusions of frame 12. Features 78 protrude into or otherwise engage holes or other mating features in blade 76 to help align and restrain blade 76 relative to tape-discharge edge 74. Contact points 80 and 82 along with the pawl's tip 28 establish the location of the spool's rotational axis 88. In addition or as an alternative to pawl 22, some examples of contact points 80 and/or 82 are in the form of a pawl-like element that provides or enhances the anti-reverse rotation function of tape dispenser system 10. Parting line 84 extending generally in longitudinal direction 86 makes it possible to injection mold a monolithic frame with side members 42 and 44 that provide ample support at both ends of spool 16. With this design, side members 42 and 44 provide spool support in both axial direction 56 and in a radial direction (perpendicular to axial direction 56), thus avoiding the use of alternative weaker structures such as a cantilever design.

Pawl 22, spool 16 and frame 12 have multiple selective configurations or positions. Pawl 22 is movable between a disengaged position (FIGS. 1, 2 and 4) and an engaged position (FIGS. 3 and 7). In the disengaged position, the pawl's tip 28 is spaced apart from spool 16. In the engaged position, the pawl's tip 28 engages spool 16 at the point of contact 60 on an inner diameter 30 or inner surface 32 of spool 16. Pawl 22 has a base 96 that connects to sidewall 48 and/or to flange 50. Pawl 22 extending from base 96 to tip 28 creates spring arm 36 that presses the pawl's tip 28 radially outward against the spool's inner surface 32. Tip 28 is spaced apart from both sidewalls 48 and 52 to facilitate a plastic injection process of making frame 12 and to provide pawl 22 with the freedom to flex without interference from neither sidewall 48 nor 52. With reference to a radial direction (i.e., perpendicular to axis 88 and axial direction 56), tip 28 is between point of contact 60 and air gap 68 to further facilitate a plastic injection molding process.

Spool 16 is movable between a removed position (FIG. 9) and an installed position (FIGS. 3, 5, 7 and 10). In the removed position, spool 16 is spaced apart from frame 12 and is outside of spool-receiving chamber 58. In the installed position, spool 16 is situated within spool-receiving chamber 58, engaged with pawl 22 and supported by side members 48 and 52. Arrow 98 of FIG. 6 represents pawl 22 automatically moving from its disengaged position toward its engaged position in response to the spool's inner axial edge 94 sliding along lead-in surface 72 as spool 16 moves from its removed position toward its installed position, as indicated by arrow 100.

Figure 8:
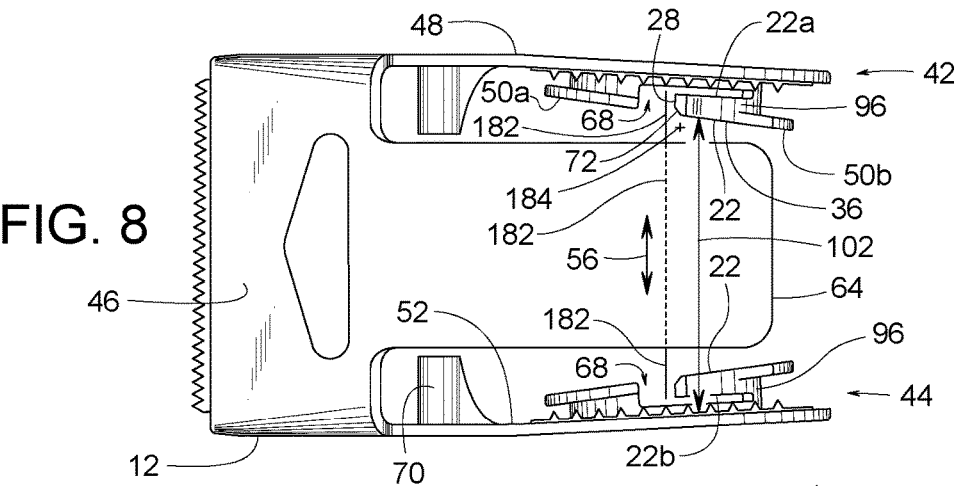
FIG. 8 is a top view of FIG. 1 with the frame in a relaxed position.
Figure 9:
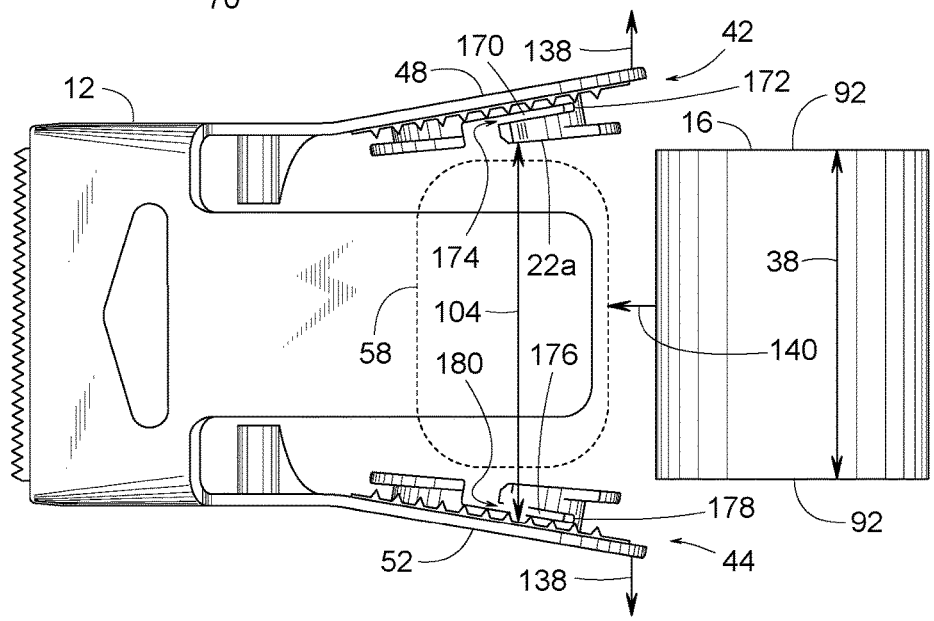
FIG. 9 is a top view similar to FIG. 8 but showing the frame in a splayed position about to receive the spool.
Figure 10:
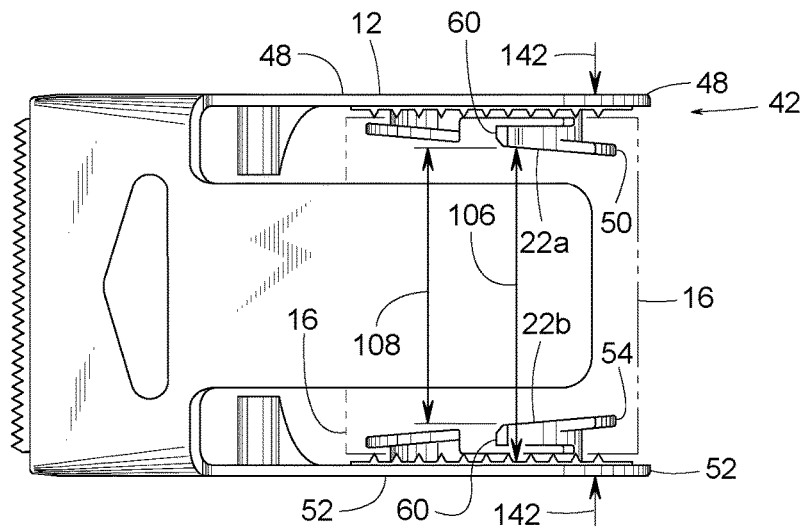
FIG. 10 is a top view similar to FIGS. 8 and 9 but showing the frame in a loaded position.

To install or remove spool 16, frame 12 is movable selectively to a relaxed position (FIGS. 1, 2, 4, and 8), a splayed position (FIG. 9), and a loaded position (FIGS. 3, 5, 7 and 10). In the relaxed position, pawl 22a is a first distance 102 from sidewall 52, as shown in FIG. 8. To install spool 16, as shown in FIG. 9, sidewalls 48 and 52 are resiliently spread apart to place pawl 22a at a second distance 104 from sidewall 52, wherein second distance 104 provides sufficient clearance for spool 16 to enter spool-receiving chamber 58. Once spool 16 is installed within spool-receiving chamber 58, sidewalls 48 and 52 are released to allow sidewalls 48 and 52 to move inward to where pawl 22a is at a third distance 106 from sidewall 52, as shown in FIG. 10. In some examples, third distance 106 is slightly greater than first distance 102 so that during normal operation sidewalls 48 and 52 apply light axial pressure against spool 16. In some examples, first distance 102 is substantially equal to third distance 106, which eases the installation and removal of spool 16. In the illustrated example, second distance 104 is greater than both first distance 102 and third distance 106, which helps ensure that spool 16 remains within spool-receiving chamber 58 during normal operation. In examples that include two pawls 22a and 22b on separate sidewalls 48 and 52, second pawl 22b is spaced apart from first pawl 22a by a pawl separation distance 108 that is greater when spool 16 is in the installed position than when spool 16 is in the removed position, thereby ensuring that both pawls 22a and 22b engage spool 16 while spool 16 is held snugly between sidewalls 48 and 52.

Figure 11:
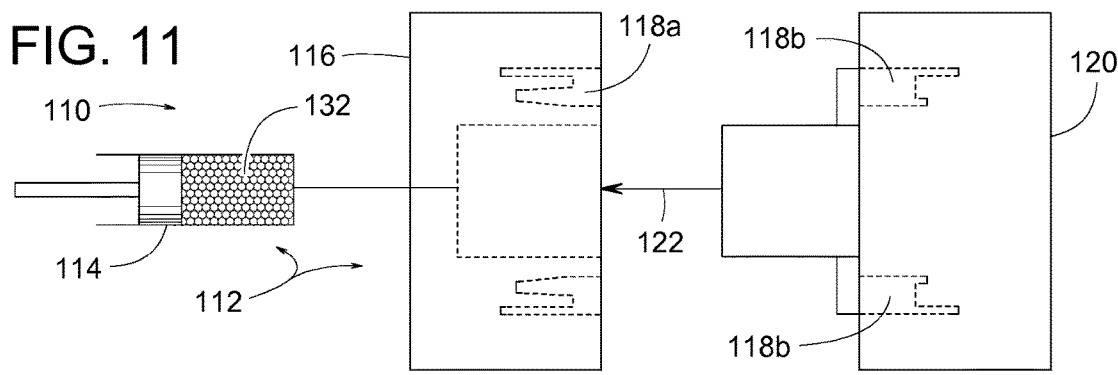
FIG. 11 is a schematic diagram showing an example tape dispenser method in accordance with the teachings disclosed herein.
Figure 12:
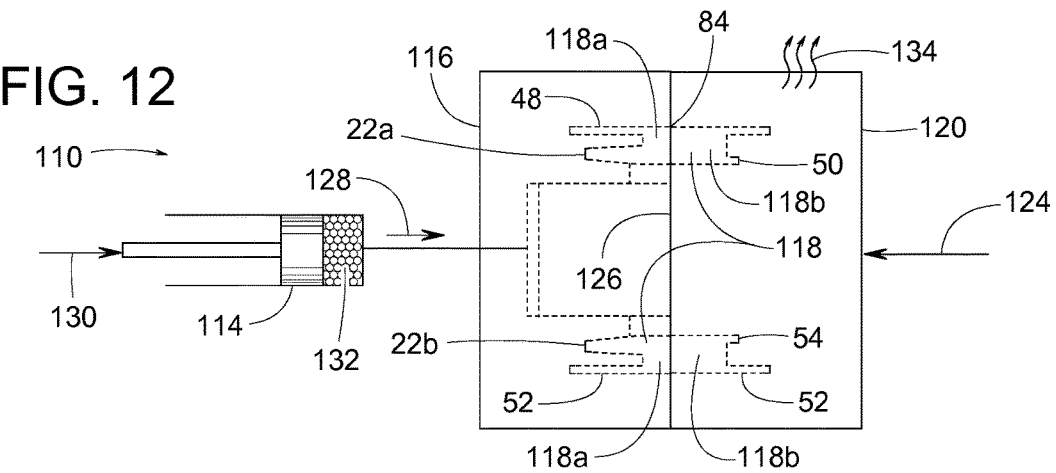
FIG. 12 is a schematic diagram showing another phase of the method shown in FIG. 11.
Figure 13:
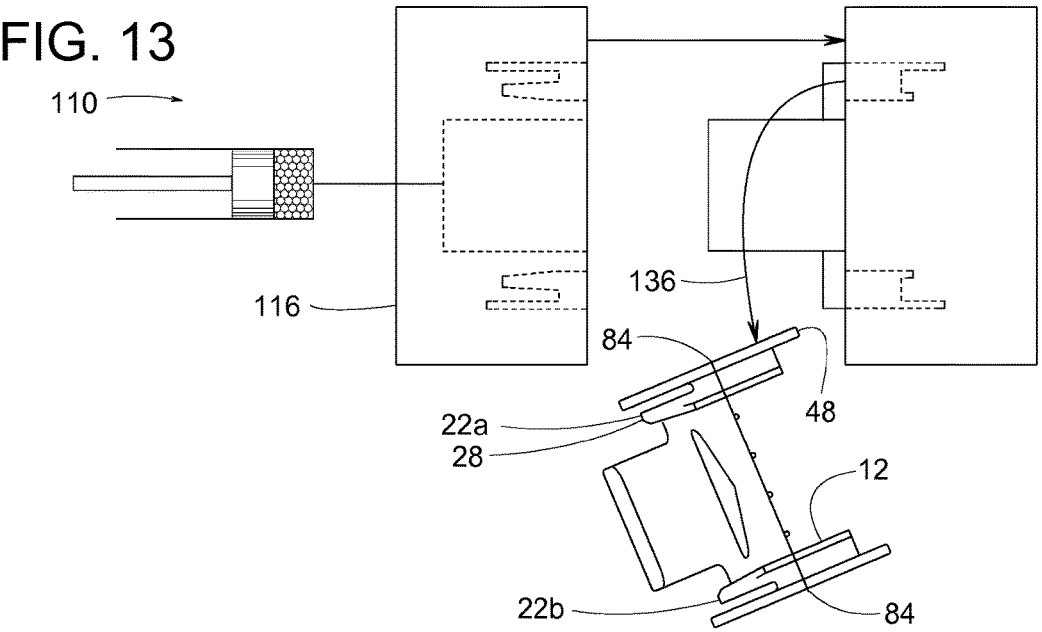
FIG. 13 is a schematic diagram showing yet another phase of the method shown in FIG. 11.

FIGS. 11-13 schematically illustrate an example tape dispenser method 110 for making frame 12 by way of a plastic injection molding machine 112. In this example, machine 112 comprises a plastic injection ram 114, a first mold block 116 defining a first cavity system 118a, and a second mold block 120 defining a second cavity system 118b. Arrows 122 and 124 represent forcing first mold block 116 and second mold block 120 together such that first mold block 116 and second mold block 120 engage each other at a mold interface 126. FIG. 12 shows that upon forcing mold blocks 116 and 120 together, first cavity system 118a and second cavity system 118b create a total cavity 118. Arrows 128 and 130 represent injecting a plastic material 132 (e.g., molten or softened ABS) into total cavity 118. Arrows 134 represent solidifying the plastic material 132 in total cavity 118, thereby creating tape dispenser frame 12. FIG. 12 shows first sidewall 48 at least momentarily extending into both cavity systems 118a and 118b. FIG. 12 also shows second sidewall 52 at least momentarily extending into both cavity systems 118a and 118b. FIG. 12 also shows flanges 50 and 54 at least momentarily extending into both cavity systems 118a and 118b. While FIG. 3 shows frame 12 defining the spool's rotational axis 88, FIG. 12 shows mold interface 126 creating parting line 84 on first sidewall 48, wherein parting line 84 extends between bridge 46 and rotational axis 88, as shown in FIG. 1. FIG. 1 also shows parting line 84 being substantially perpendicular to rotational axis 88. In some examples, sidewall 52 includes an inner surface 52a facing sidewall 48 and an outer surface 48b facing away from sidewall 48, and parting line 84 is on the sidewall's outer surface 52b.

Figure 5:
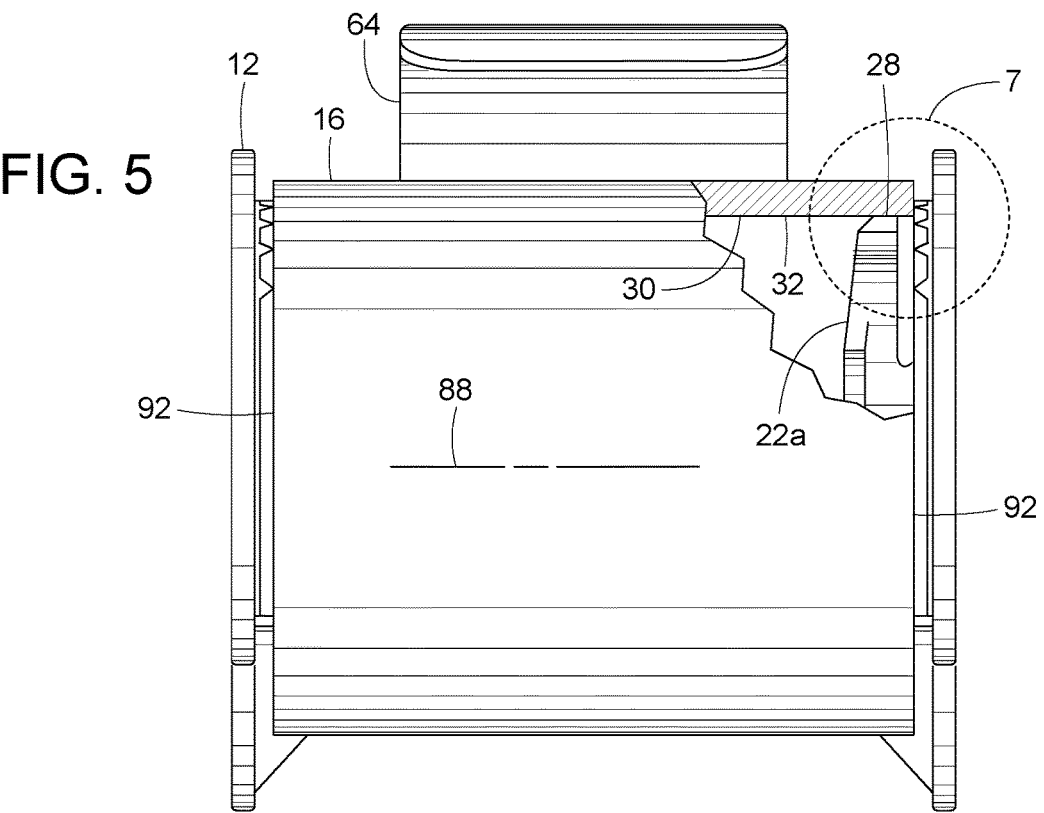
FIG. 5 is a back view similar to FIG. 4 but showing an installed spool with no tape and with part of the spool cut away.

Arrow 136 of FIG. 13 represents removing tape dispenser frame 12 from total cavity 118. Arrows 138 of FIG. 9 represents resiliently splaying first sidewall 48 and second sidewall 52 to widen spool-receiving chamber 58 between first sidewall 48 and second sidewall 52. Arrow 140 of FIG. 9 represent inserting spool 16 into spool-receiving chamber 58. Arrows 142 of FIG. 10 represent first sidewall 48 and/or second sidewall 52 flexing toward spool 16. FIGS. 3, 5 and 10 show first flange 50 and second flange 54 supporting spool 16. FIGS. 3, 5 and 7 show first pawl 22 engaging the spool's inner diameter 30 such that spool 16 can rotate more freely in one direction 26 than in an opposite direction 24.

In some examples, pawl 22 is of a shape that facilitates a plastic injecting molding process. Referring back to FIGS. 4-7, pawl 22 includes base 96, a first edge 144 and a second edge 146. Base 96 adjoins first sidewall 48, and first edge 144 (with respect to axial direction 56) is between first sidewall 48 and second edge 146. First edge 144 extends lengthwise from base 96 to tip 28, and second edge 146 (with respect to axial direction 56) is between first edge 144 and second sidewall 52. Second edge 146 extends lengthwise from base 96 to tip 28, and first edge 144 and second edge 146 converge from base 96 to tip 28.

Figure 14:
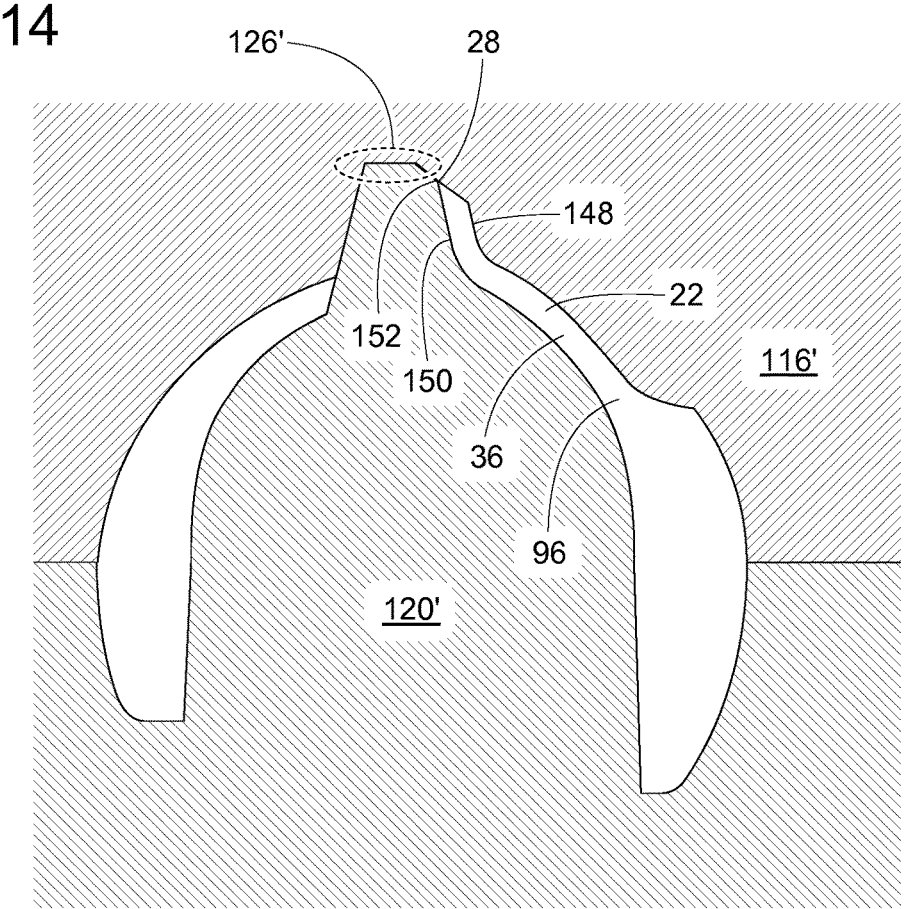
FIG. 14 is a cross-sectional view of two example mold blocks producing an example pawl in accordance with the teaching disclosed herein.

In some examples, as shown in FIG. 14, pawl 22 includes a first surface 148 and a second surface 150, wherein first surface 148 at least momentarily lies against a first mold block 116', and second surface 150 at least momentarily lies against a second mold block 120'. This results in a mold interface 126' creating a sharp parting line 152 at the pawl's tip 28 and thus at a point of contact 60 where pawl 22 engages the spool's inner diameter 30. In some examples, the spool's tip 28 being sharp enhances the pawl's ability to "bite" into the spool's inner surface 32 and thus more effectively resist reverse rotation of spool 16.

Figure 15:
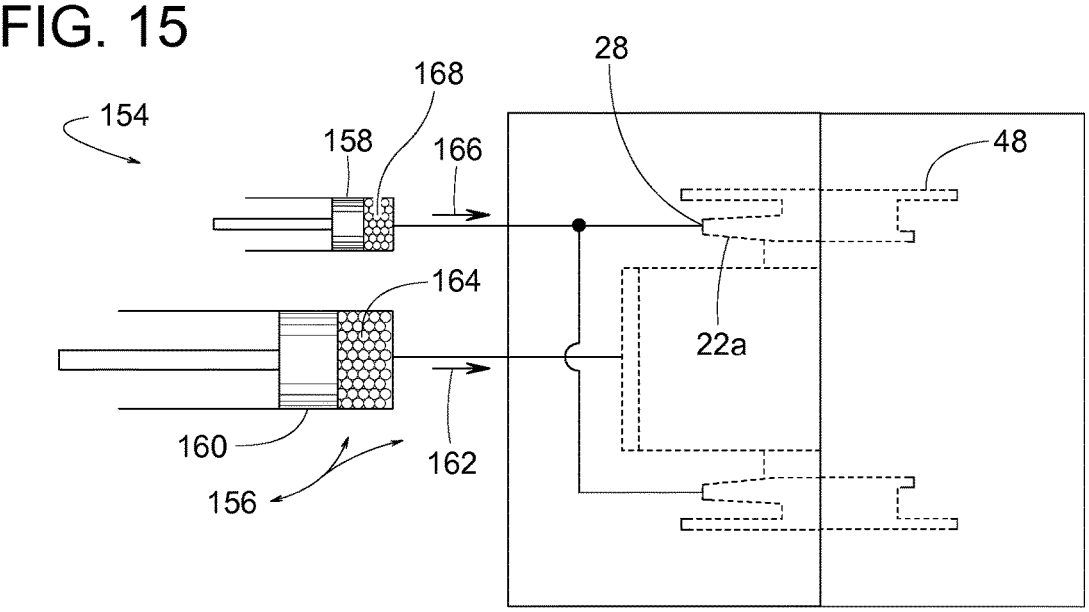
FIG. 15 is a schematic diagram similar to FIG. 12 but showing another example tape dispenser method in accordance with the teachings disclosed herein.

FIG. 15 illustrates an example tape dispenser method 154 using a dual-injection process for making frame 12 with the pawl's tip 28 being softer and more flexible than sidewall 48. In some examples, tip 28 being relatively soft or rubbery increases the coefficient of friction between tip 28 and the spool's inner surface 32. The increased friction can improve the pawl's ability to resist reverse rotation of spool 16 while the pawl's greater flexibility enables pawl 22 to yield to the spool's forward rotation. The term, "dual injection" refers to any plastic injection molding process where the finished product is comprised of two different plastic injected materials. Examples of known dual injection processes include, but are not limited to, co-injection molding, multishot molding, overmolding, two-shot molding, two-times injection molding, and insert molding. In some examples, a single plastic injection molding machine 156 includes one ram 158 for injecting a thermoplastic elastomer or thermoset elastomer for the pawl's tip 28 and another ram 160 for injecting a thermoplastic or thermoset plastic for the rest of frame 12. Arrow 162 represents injecting a first base material 164 to create at least part of first sidewall 48, and arrow 166 represents injecting a second softer material 168 to create at least part of first pawl 22 (e.g., tip 28 of pawl 22).

It should be noted that all references cited in this disclosure, including U.S. Pat. Nos. 8,925,611; 8,813,806; 8,191,597; 8,042,592; 7,370,782; 7,353,854 are herein incorporated by reference in their entirety. Also, for further clarification, it should be further noted that the term, "pawl," refers to any finger, tab, bar or other elongate member that in reaction to being urged to move in a first direction across and relative to an adjacent surface, the elongate member tends to bind against the adjacent surface with more binding force in the first direction than in an opposite direction, wherein the adjacent surface can be of any geometry including, but not limited to, smooth, irregular, cogged, toothed, curved, etc. The term, "flange," refers to any protrusion extending at least partially from one sidewall toward another sidewall. The term, "bridge," as it pertains to first and second sidewalls, refers to any structural member that extends from the first sidewall to the second sidewall, thereby spanning the distance between the two sidewalls. The term, "monolithic," as it pertains to a structure means that the structure is a seamless unitary piece. A structure made using a common plastic injection molding process is one example of a monolithic structure. The term, "mold parting line," refers to a substantially linear step, offset or other discontinuity between two adjoining surfaces, wherein such a step, offset or discontinuity would be considered, by those of ordinary skill in the art, as actually being or at least resembling a surface imperfection that is typically characteristic of an imperfect or intentional interface between two plastic injection mold halves. In some examples, a mold parting line occurs along the interface between two adjoining surfaces of a part, wherein the two surfaces are slightly non-parallel (e.g., less than five degrees), which can be due (but not necessarily due) to a draft angle that facilitates removal of the part from a plastic injection mold. The term, "radial" refers to a direction generally perpendicular to the spool's rotational axis 88 when spool 16 is in the installed position. The term, "axial" refers to a direction generally parallel to the spool's rotational axis 88 when spool 16 is in the installed position. While spool 16 being in the installed position defines rotational axis 88, that defined rotational axis, by definition, remains fixed in space relative to bridge 46 even if spool 16 is later moved from the installed position to the removed position. The term, "converging," as it pertains to two edges means that the distance between the two edges becomes progressing less over the length of the edges; however, the edges do not necessarily intersect each other.

In addition or alternatively, some examples of tape dispenser system 10 are defined as a tape dispenser system comprising: first sidewall 48; second sidewall 52 spaced apart from first sidewall 48 to define a spool-receiving chamber 58 between first sidewall 48 and second sidewall 58; bridge 46 providing an integral seamless connection between first sidewall 48 and second sidewall 52; spool 16 disposed within spool-receiving chamber 58; adhesive tape 18 wrapped around spool 16; and first pawl 22a having a base 96, tip 28, first edge 144 and second edge 146, the base 96 adjoining first sidewall 48, tip 28 engaging spool 16, first edge 144 being between first sidewall 48 and second edge 146, first edge 144 extending lengthwise from base 96 to tip 28, second edge 146 being between first edge 144 and second sidewall 52, second edge 146 extending lengthwise from base 96 to tip 28, and first edge 144 and second edge 146 converging from base 96 to tip 28.

FIGS. 4 and 8-10 show that the right and left sides of tape dispenser frame 12 are mirror images of each other, thus the two sides have corresponding first and second elements, such as sidewalls 48 and 52, flanges 50 and 54, pawls 22 (22a and 22b), pawl tips 28, pawl bases 96, point of contacts 60, and air gaps 68. FIGS. 2, 4, 8 and 9 identify certain geometries, such as lines, directions and voids (e.g., slots) that lie in spatial reference to various structural features of tape dispenser frame 12. Such geometries make it possible to manufacture frame 12 using plastic injection molding.

Figure 4:
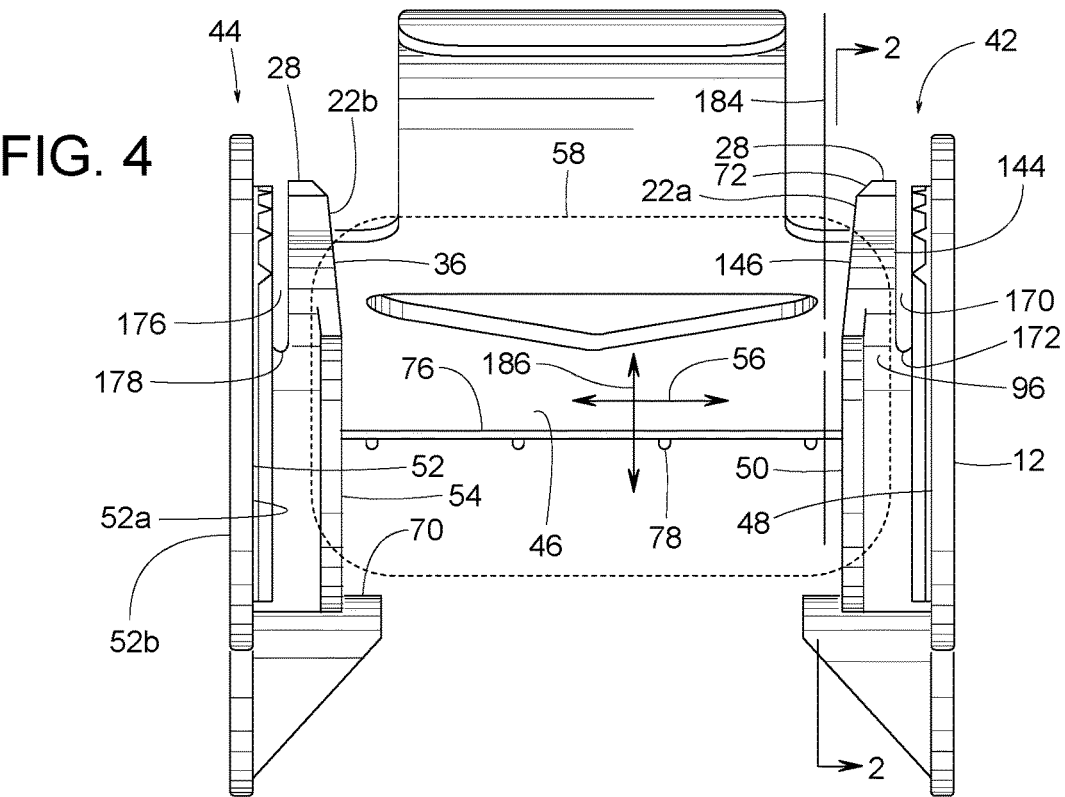
FIG. 4 is a back view of FIG. 1.

FIGS. 4 and 9, for instance, show a first slot 170 defined widthwise between first pawl 22a and at least one of first flange 50 and first sidewall 48. First slot 170 is shown extending lengthwise between a first closed end 172 of first slot 170 and a first open end 174 of first slot 170. First closed end 172 is shown adjacent to a first base 96 of first pawl 22a. First open end 174 is shown being adjacent and open to a first air gap 68.

Likewise, FIGS. 4 and 9 show a second slot 176 defined widthwise between second pawl 22b and at least one of second flange 54 and second sidewall 52. Second slot 176 is shown extending lengthwise between a second closed end 178 of second slot 176 and a second open end 180 of second slot 176. Second closed end 178 is shown adjacent to a second base 96 of second pawl 22b. Second open end 180 is shown being adjacent and open to a second air gap 68.

FIGS. 2 and 8 show a clear lateral line-of-sight 182 being parallel to rotational axis 88 and extending unobstructed between the two air gaps 68 when frame 12 is in the relaxed position with spool 16 in the removed position. Lateral line-of-sight 182 is shown being underneath tongue 64, so tongue 64 provides no obstruction to lateral line-of-sight 182.

FIGS. 4 and 8 show frame 12 providing a clear radial line-of-sight 184 lying unobstructed between tongue 64 and first pawl 22a. Radial line-of-sight 184 is shown extending in a radial direction 186 that is substantially perpendicular to both longitudinal direction 86 and rotational axis 88, wherein FIG. 1 shows longitudinal direction 86 extending from rotational axis 88 toward bridge 46. Longitudinal direction 86, axial direction 56 (e.g., rotational axis 88) and radial direction 186 are shown substantially perpendicular to each other.

Various modifications and alterations to this invention will become apparent to those of ordinary skill in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A tape dispenser method involving the use of at least one of a first mold block, a second mold block and a plastic material, the tape dispenser method comprising:
    the first mold block defining a first cavity system;
    the second mold block defining a second cavity system;
    forcing the first mold block and the second mold block together such that the first mold block and the second mold block engage each other at a mold interface;
    upon forcing the first mold block and the second mold block together, the first cavity system and the second cavity system creating a total cavity;
    injecting the plastic material into the total cavity;
    solidifying the plastic material in the total cavity, thereby creating a tape dispenser frame comprising a first sidewall, a first flange on the first sidewall, a second sidewall, a second flange on the second sidewall, a bridge extending between the first sidewall and the second sidewall, and a first pawl extending from at least one of the first sidewall and the first flange;
    the first sidewall at least momentarily extending into both the first cavity system and the second cavity system;
    the second sidewall at least momentarily extending into both the first cavity system and the second cavity system;
    removing the tape dispenser frame from the total cavity;
    resiliently splaying the first sidewall and the second sidewall to widen a spool-receiving chamber between the first sidewall and the second sidewall;
    inserting the spool into the spool-receiving chamber;
    at least one of the first sidewall and the second sidewall flexing toward the spool;
    the first flange and the second flange supporting the spool;
    the first pawl engaging an inner diameter of the spool such that the spool can rotate more freely in one direction than in an opposite direction; and
    the mold interface creating a parting line on the first pawl at a point where the first pawl engages the inner diameter of the spool.

2. The tape dispenser method of claim 1, wherein the plastic material includes a first base material and a second softer material, and the tape dispenser method further comprising:
    injecting the first base material to create at least part of the first sidewall; and
    injecting the second softer material to create at least part of the first pawl.

* * * * *